Nov. 19, 1940.　　S. O. WHITE　　2,221,894
TRANSMISSION SYNCHRONIZER
Filed Oct. 11, 1937
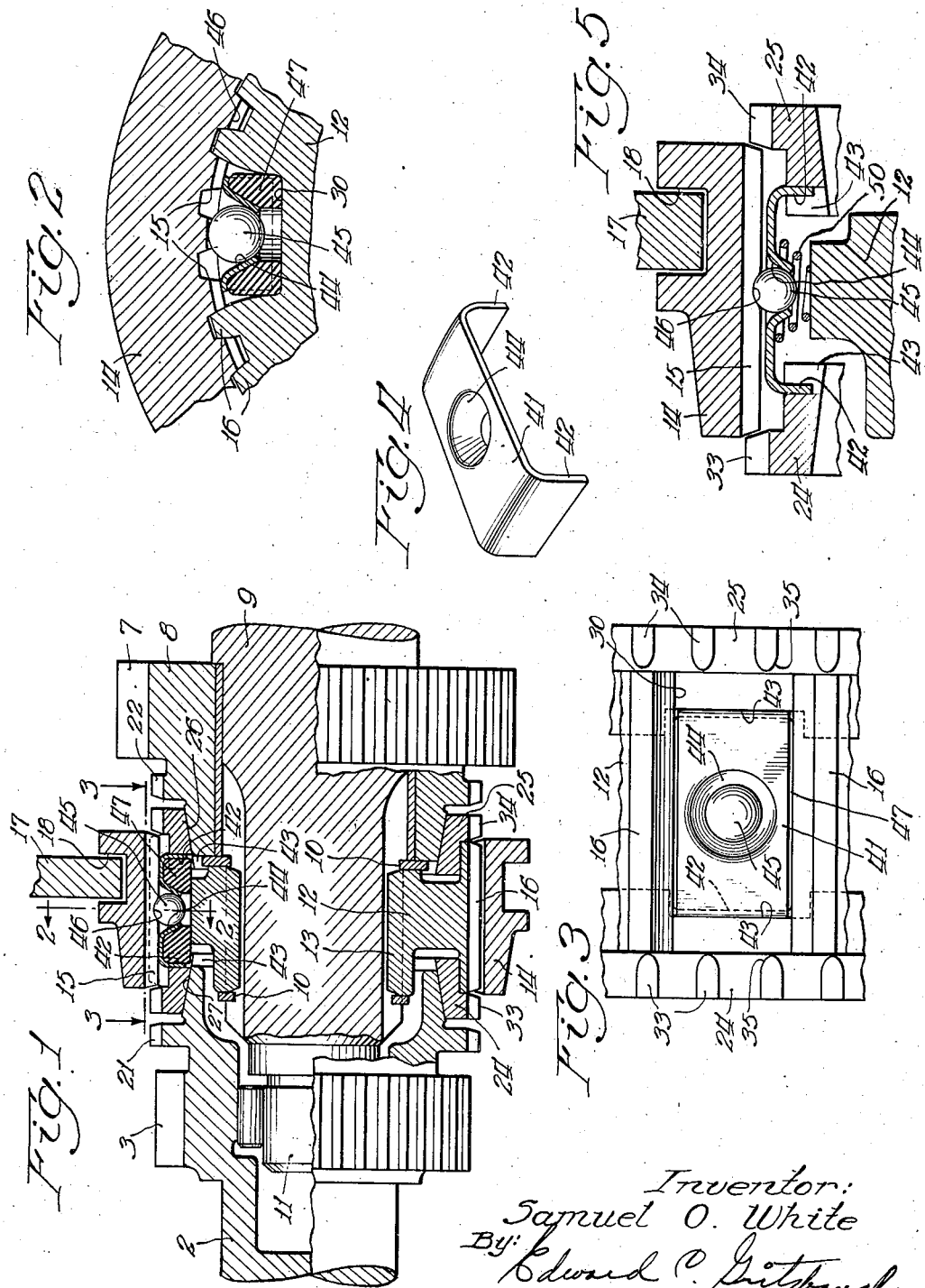
Inventor:
Samuel O. White Patented Nov. 19, 1940

2,221,894

UNITED STATES PATENT OFFICE 2,221,894

TRANSMISSION SYNCHRONIZER

Samuel O. White, Muncie, Ind., assignor to Borg-Warner Corporation, Chicago, Ill., a corporation of Illinois Application October 11, 1937, Serial No. 168,317

21 Claims. (Cl. 192—53)

This invention relates to improvements in transmission synchronizers such as employed in the change-speed transmissions of motor vehicles to bring driving and driven power transmitting elements to the same speed before drivingly interlocking the elements through positive clutch means. The invention is particularly directed to transmission synchronizers of the so-called "blocker" type having means to prevent engagement of the positive drive clutch prior to the time that synchronization takes place.

It is the principal object of my invention to provide an improved transmission synchronizer of the blocker type, such for example, as that illustrated and described in the co-pending application of John M. Simpson and S. O. White, Serial No. 168,401, filed October 11, 1937, but which possesses certain features of improvement over the transmission synchronizers disclosed therein.

Another object is to provide an improved transmission synchronizer as described, in which synchronizer-blocker rings are employed, and wherein the construction of such rings and their relationship to cooperating parts of the transmission mechanism is such as to permit of the employment of a minimum amount of bronze stock in the manufacture of such rings.

Another object is to provide a transmission-synchronizer, as described, incorporating a simple and novel means for establishing a lost-motion rotary drive between one of the torque-transmitting members and the synchronizer-blocker rings.

A further object is to provide an improved transmission synchronizer, as described, which is simple in construction and which may be manufactured at a relatively low cost.

Other objects, the advantages and uses of the invention will become apparent after reading the following specification and claims, and after consideration of the drawing forming a part of the specification, wherein:

Fig. 1 is a fragmentary elevation partially in section, of a change speed transmission mechanism incorporating my improved synchronizer;

Fig. 2 is a sectional view along the line 2—2 of Fig. 1;

Fig. 3 is a view taken substantially along the line 3—3 of Fig. 1;

Fig. 4 is a perspective view of one of the thrust members forming part of the synchronizer assembly; and Fig. 5 is a fragmentary sectional view illustrating a modified form of the mechanism shown in Fig. 1.

I have selected for illustration herein, embodiments of my invention as applied to certain of the torque-transmitting members of the conventional change-speed transmission of the type used in motor vehicles and such as illustrated in my prior U. S. Letters Patent No. 1,872,566.

With reference to Figs. 1 to 3 hereof, such transmission may include a drive shaft 2 having formed thereon an external gear 3 adapted to mesh with a countershaft (not shown). A second gear 8, rotatably mounted upon the transmission drive shaft 9, but fixed against axial movement relative thereto by washers 10, and also in mesh with a gear on the countershaft (not shown), provides the second-speed gear of the change-speed transmission. The shaft 2, and the shaft 9 upon which the gear 8 is rotatably mounted, are mounted upon the same axis and one end 11 of the shaft 9 may be piloted, as indicated, in the adjacent end of the shaft 2, as shown.

A clutch supporting member 12 is mounted upon the shaft 9 between the gear 3 and gear 8 and is keyed thereto, as indicated at 13. The member 12 is also fixed against axial movement relative to the shaft 9 by thrust washers 10 and serves as a support for the movable element 14 of a positive jaw clutch. Except for practical difficulties of construction, the member 12 could be formed integral with the shaft 9. The movable jaw clutch element 14 may take the form of a sleeve having internal gear-like clutch teeth 15 slidably engaged with a complementary externally toothed portion 16 of the member 12 (see Fig. 2). A shift fork 17 received in an annular groove 18 formed in the outer wall of the clutch element 14 serves as a means axially to shift the member 14 selectively in the direction of the gear 3 or gear 8 as desired. Positive jaw clutch teeth conforming in contour with the teeth 16 upon the member 12 and adapted to be synchronized in end to end register therewith are formed upon each of the gears 3 and 8, as illustrated at 21 and 22 respectively. Movement, therefore, of the clutch element 14 to the left, as viewed in Fig. 1, will serve positively to drivingly interconnect the drive member 2 with the shaft 9, and, in like manner, movement of the clutch element 14 to the right, will provide a direct drive connection between the gear 8 and the shaft 9. Such engagement of the positive jaw clutch may not take place, however, without clashing of the parts and injury thereto, unless the relatively fixed clutch part to which the movable clutch element 14 is drivingly engaged, is rotating at the same speed as the element 14 and is in synchronism therewith.

In order to establish synchronism between the movable jaw clutch element 14 turning with the shaft 9, and the relatively fixed parts 21 or 22, as desired, I provide a friction clutch synchronizer mechanism between the support member 12 and the gears 3 and 8. Such mechanism, in the construction illustrated, may comprise a pair of forged bronze rings 24 and 25, respectively, one located at each side of the support member 12 and each having a conical friction surface 26 engageable with a complementary friction surface 27 formed on an adjacent portion of the gear 3 and gear 8, respectively.

A lost-motion rotary driving connection between the rings 24 and 25 and the shaft 9 through the support 12 to permit of slight relative rotation between the ring and the shaft will be hereinafter described.

The rings 24 and 25 each possess, in addition to the function of a friction clutch synchronizer element, the function of a blocker mechanism for preventing engagement of the jaws of the positive clutch 14—21 and 14—22 prior to the time when synchronism of the positive jaw clutch parts takes place. This function of the rings 24 and 25 may be carried out by the provision of radially extending external blocker teeth 33 and 34 formed on the outer peripheries of the rings 24 and 25 respectively. The blocker teeth 33 and 34 may be further formed with those ends thereof facing the slidable clutch member 14 chamfered as indicated at 35 in Fig. 3. The adjacent ends of the teeth 15 on the clutch member 14 may be likewise chamfered so that the movement of the jaw member 14 in the direction of the relatively fixed jaw teeth 21 or 22 may cause the registering chamfered surfaces of the blocker teeth and jaw clutch teeth to contact along surfaces disposed angularly with respect to the axis of rotation of the clutch part at such times as when the teeth 33 or 34 are not in direct end to end register with the teeth 16 upon the clutch support member 12. This condition of the parts may exist whenever one of the two torque-transmitting members to be interconnected, such as the shaft 9 to the gear 3 or to the gear 8, is rotating at a speed different from the speed of the remaining member, hence causing the synchronizer-blocker ring to move toward one or another of its limits of rotation relative to the support 12. As the parts approach synchronism there will be a relative reversal of rotation, thus causing the blocker teeth for a moment to register directly with the teeth 16 on the support 12, and in such movement the clutch element 14 will be free to continue in its movement into engagement with the relatively fixed jaw clutch teeth toward which it has been initially moved. This blocking function of the synchronizer rings will of course take place only when the rings are urged toward their adjacent friction clutch complement so as to bring about frictional driving engagement between the synchronizer-blocker ring and the torque member with which the ring is engaged frictionally.

Means for causing the synchronizer-blocker rings to move axially so as to block positive jaw clutch engagement and thereafter to synchronize the parts to be coupled upon movement of the positive clutch element 14, and to effect driving engagement between the support member 12 and the synchronizer-blocker rings in such manner as to permit slight relative rotary movement between the rings and the support 12 may comprise a plurality of relatively light-weight and low inertia thrust members 41 spaced at equal distance apart from one another about the circumference of the support member 12 and disposed parallel to the axis thereof. Each thrust member may be located in a channel 30 formed transversely across the toothed peripheral surface of the support member 12, and each has inwardly-turned flanges at its opposite ends, as indicated at 42, receivable within radially extending grooves formed in the adjacent end surfaces of the opposed synchronizer-blocker rings. These recesses, which are indicated at 43, are of a width slightly greater than the width of the thrust members 41 so that while the thrust members 41 are held against lateral movement relative to the support 12, the rings 24 and 25 may each rotate relative to the support 12 an amount determinable by the difference in width between the recesses 43 and the width of the thrust member 41. I prefer to establish this difference in width in an amount substantially equal to but in no event greater than the entire width of one of the blocker teeth 33 or 34. The depth of the recesses 43 are such that longitudinal movement of the thrust members 41 to the left or to the right, as indicated in Fig. 1, will cause the adjacent ends of the thrust members to abut the inner walls of the recesses of the adjacent synchronizer-blocker ring to cause such ring to move therewith toward frictional engagement with its friction clutch counterpart carried by the gear 3 or 8 respectively.

Each of the thrust members 41 may have formed at its mid-portion a radially outwardly facing conical depression 44 within which a steel ball 45 is disposed and adapted to be received within an annular groove 46 extending about the inner toothed wall of the positive jaw clutch member 14, at substantially its midpoint. A rubber cushion 47 disposed between each thrust member 41 and the adjacent bottom wall of its receiving channel 30 formed in the support 12 serves yieldingly to urge the thrust member 41 radially outwardly toward the inner wall of the positive jaw clutch member 14 to effect yielding reception of the steel ball 45 in the groove 46.

It will readily be apparent that, with the parts arranged as described, initial movement of the positive clutch element 14 toward either of its complementary clutch portions 21 or 22 will cause the thrust members 41 to move therewith and to bear against and to urge one of the synchronizer-blocker rings 24 or 25 toward its friction clutch complement depending upon which direction the positive clutch member 14 is urged. This initial axial movement of the synchronizer-blocker ring will cause the ring, when engaged with its friction clutch complement, to turn with the part to which it is frictionally engaged and thus cause a relative rotation between the ring and the support member 12 in the direction of the movement of the part which is rotating at a superior speed, thus to cause the chamfered surfaces of the blocker teeth and the positive jaw clutch teeth 15 to move into blocking register. Continued movement of the positive jaw clutch element 14 will thereupon be resisted by the chamfered surfaces of the blocker teeth even though considerable force is applied to the positive clutch element 14, tending to cause it to move into engagement with its desired positive jaw clutch complement. This resistance to positive clutch engagement will exist until the part to be drivingly interlocked to the positive jaw clutch, arrives at a synchronous speed therewith at which point there will be a relative reversal of movement causing the blocker-synchronizer ring to move to a position where the blocker teeth are in register with the teeth 16 upon the support 12. When such position is assumed, there will be no further resistance to clutch movement of the part 14 and it may, therefore, be urged onwardly into positive clutch engagement with the teeth 21 or 22, the yielding connection between the thrust members 41 and annular grooved portion 46 of the clutch element 14 breaking away under the force applied to move the clutch element 14.

The mechanism herein described possesses several meritorious features heretofore unattained in transmission synchronizers of the blocker type, among the more important of which is the dual function of the thrust members 41 and associated parts, first, to provide a means for transmitting axial thrust from the positive clutch jaw 14 to the synchronizer-blocker ring, and secondly, to provide a means for establishing driving engagement between the support member 12 and the synchronizer-blocker ring in such manner as to permit slight relative rotary movement between the ring and support. Heretofore it has been the practice to form integral lugs upon the blocker ring or to provide bolts engageable with the ring and with the support 12 to establish such lost-motion rotary driving connection. Such construction, however, not only complicates manufacture of the synchronizer-blocker ring, but necessitates in the case of the aforementioned lugs, the waste of considerable costly material, such as cast bronze from which such rings are manufactured.

In addition to the provision of a dual function with respect to the thrust members 41, as above described, my present improvement in transmission synchronizers employs as a means radially to urge the thrust members 41 outwardly toward the grooved inner wall of the positive clutch jaw 14 in order to establish the break-away engagement between thrust members and clutch jaw, a resilient block 47 constructed of rubber or other material of a resilient nature which is not likely to break or become fractured through abuse, thus to become loose and injure the transmission parts. Where vulcanized rubber is used for the cushion, I deem it desirable to coat the same with a protective coating of some material that will prevent lubricant from contacting the rubber, thus to prevent its deterioration.

Another feature of the mechanism herein described is that the thrust members are so arranged relative to their cooperating parts that thrust is directed squarely against the rearward end surfaces of the synchronizer-blocker rings, thus to preclude any possibility of placing undue strains upon portions of the ring such as those portions having the blocker teeth, as in the case of the transmission synchronizer disclosed and claimed in the aforementioned pending application for Letters Patent.

The overlapping of the recessed portions of the synchronizer-blocker ring and the thrust members provides a noted improvement in that it permits the transmittal of relatively high torque between support 12 and ring as during the synchronizing operation. This feature is of particular importance when the operator desires quickly to establish synchronism of the torque-transmitting parts and places considerable manual pressure against the shift fork 17.

In Fig. 5 I have illustrated a modification of the mechanism illustrated in Fig. 1 which differs therefrom only by the substitution of a conical compression spring 50 in place of the resilient cushion 47. The radially inward end of the springs may bear directly against the bottom wall of the channel 30 while the upper portion thereof may circumscribe the conical depressed portion of the thrust member 41. Since the smaller end of the spring is resting upon the bottom wall of the channel 30, there is little likelihood of it becoming displaced, and the inner wall surfaces of the conical depressed portion of the thrust member 41 serves adequately to locate the outer and broader end of the conical spring. This construction, as in the case of that previously described with respect to the application of radial pressure against the thrust member 41, is particularly simple and may be incorporated in the synchronizer with ease of assembly.

I claim:

1. In a transmission synchronizer of the character described, a rotatably mounted and axially fixed torque-transmitting member, an axially movable clutch element encircling said member and drivingly connected thereto, a plurality of thrust members free to slide axially relative to said torque member and adapted to rotate therewith, cushioning blocks of compressible material urging said thrust members radially outward of the axis of said torque member toward the inner wall of said clutch element, and means providing a break-away connection between said torque members and said clutch element, said means including projecting elements carried by the thrust members and adapted to engage in complementary recesses in the movable clutch element under the yielding pressure of said cushioning blocks transmitted to said projecting elements through the medium of said thrust members.

2. In a transmission synchronizer of the character described, a rotatably mounted and axially fixed torque-transmitting member, a second rotatably mounted torque-transmitting member in axial alignment with the first said member and having a friction surface, an axially movable clutch element encircling said first member and drivingly connected thereto, a synchronizer ring having a friction surface engageable with the friction surface formed on said second member and coaxial with said members, a plurality of thrust members free to slide axially relative to said first torque member and adapted to rotate therewith, said synchronizer ring having recesses formed in that portion thereof in register with the ends of said thrust members of a width greater than the width of said thrust members, whereby to provide a lost motion rotary connection between said first torque member and said ring, resilient means urging said thrust members radially outward of the axis of said torque member toward the inner wall of said clutch element, and means providing a break-away connection between said thrust members and said clutch member adapted to resist disengagement in an amount determinable by the force exerted upon the thrust members by said resilient means.

3. The combination defined in claim 2, wherein said synchronizer ring and said axially movable clutch element are each provided with cooperating portions whereby when the synchronizer ring is moved toward either limit of its lost motion rotary connection with said first torque member, axial movement of said clutch element is resisted, and whereby said resistance to axial movement is nil when said synchronizer ring arrives at a position relative to said first torque transmitting member between its said limits of relative rotary movement.

4. The combination defined in claim 2, wherein said resilient means comprises a compressible cushion, one interposed between each of the thrust members and an adjacent wall of said first torque-transmitting member.

5. In a transmission synchronizer having an axially movable clutch jaw and a synchronizer ring mounted for axial movement along the axis of said jaw, a plurality of thrust members mounted for longitudinal movement in paths parallel to said axis and having their ends formed with radially inwardly extending fingers adapted to abut the adjacent wall portion of said synchronizer ring, steel balls, one for each of said thrust members socketed in that wall of each of said thrust members opposed to the adjacent wall of said clutch jaw so as to receive radially outwardly directed thrust therefrom, said clutch jaw having recesses in said adjacent wall adapted yieldably to receive said steel balls, and resilient means urging said thrust members radially outwardly and thereby transmitting, through the medium of said thrust members, yielding thrust to said balls, whereby to provide a break-away connection between said clutch jaw and said thrust members adapted to yield upon resistance to axial movement of said synchronizer ring.

6. In a transmission synchronizer having an axially movable clutch jaw and a synchronizer ring mounted for axial movement along the axis of said jaw, a plurality of thrust members mounted for longitudinal movement in paths parallel to said axis and having their ends adapted to abut the adjacent wall portion of said synchronizer ring, steel balls carried by said thrust members, said clutch jaw having recesses in said adjacent wall, said thrust members engaging said balls so as to transmit radial thrust thereto for yieldingly urging said balls outwardly for engagement with said recesses, whereby to provide a break-away connection between said clutch jaw and said thrust members adapted to yield upon resistance to axial movement of said synchronizer ring.

7. In a transmission synchronizer having an axially movable clutch jaw and a synchronizer ring mounted for axial movement along the axis of said jaw, a plurality of thrust members of sheet metal mounted for longitudinal movement in paths parallel to said axis and having their ends formed with radially extending flanges adapted to abut the adjacent wall portion of said synchronizer ring, said wall portion being recessed to provide a lost motion rotary connection between said thrust member and said ring, said thrust members having radially inwardly depressed regions forming sockets, ball elements interposed between said sockets and said recessed wall portion, adapted to receive radially outwardly directed thrust from said sockets and retained by said sockets against lateral displacement, and resilient means urging said thrust members radially outward toward the recessed portion of said clutch jaw, whereby to provide a break-away connection between said clutch jaw and said thrust members adapted to yield upon resistance to axial movement of said synchronizer ring.

8. In a transmission synchronizer, a rotatably mounted and axially fixed torque-transmitting member, an axially movable clutch element encircling said member and drivingly connected thereto, a plurality of thrust members free to slide axially relative to said torque-transmitting member and adapted to rotate therewith, compressible cushioning means interposed between said thrust members and said torque-transmitting member, urging said thrust members radially outwardly toward the inner wall of said clutch element, and means providing a break-away connection between said torque-transmitting member and said clutch element adapted to resist disengagement in an amount determinable by the force exerted upon the thrust members by said cushioning means, said break-away connection means comprising balls socketed in the radially outward sides of said thrust members and yieldingly urged by said cushioning means acting through the medium of said thrust members, into engagement with cooperating depressions in the inner wall of said movable clutch element.

9. In a transmission synchronizer of the character described, a rotatably mounted and axially fixed torque-transmitting member, a second rotatably mounted torque-transmitting member in axial alignment with said first member and having a friction surface, an axially movable clutch element encircling said first member and drivingly connected thereto, a synchronizer ring having a friction surface engageable with the friction surface formed on said second member, said synchronizer ring being associated with said first member and adapted to move axially with respect thereto, and a plurality of thrust members free to slide axially relative to said first member and adapted to rotate therewith, said synchronizer ring having axially opening recesses in which the ends of said thrust members are received, and in which said thrust members engage said synchronizer ring for transmitting axial thrust thereto, said recesses being greater in width than said thrust members, whereby to provide a circumferential lost motion driving connection between said first member and said ring.

10. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted under axial pressure to establish frictional synchronizing engagement with said other torque-transmitting member, and a thrust member arranged to receive thrust from said movable clutch element and having an end engaged against said synchronizer element and received in a recess therein, circumferentially wider than said end, whereby to transmit thrust to said synchronizer element and to form a circumferential lost motion driving connection between said one torque-transmitting member and said synchronizer element, the latter including blocking means adapted, in one of its positions permitted by said last mentioned connection, to block the path of axial movement of said movable clutch element and, in another of such positions, to allow the movable clutch element to complete its axial shifting movement.

11. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element carried by said one torque-transmitting member and adapted under axial pressure to establish frictional synchronizing engagement with said other member, and a thrust member arranged to receive axial thrust from said movable clutch element and associated with said synchronizer element so as to transmit such thrust thereto and so as to form therewith a circumferential lost motion driving connection between said one member and said synchronizer element, said synchronizer element including blocking means adapted, in one of its positions permitted by said lost motion connection, to block the path of axial movement of said movable clutch element, and in another of such positions, to allow the movable clutch element to complete its axial shifting movement.

12. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted to be axially moved into frictional driving engagement with said other member, and a thrust member arranged to receive axial thrust from said movable clutch element and associated with said synchronizer element so as to transmit such thrust thereto for causing said axial movement and so as to form a circumferential lost motion driving connection between said synchronizer element and said one torque-transmitting member, said synchronizer element including blocking means adapted, in one of its positions permitted by said lost motion connection, to block the path of axial movement of said movable clutch element and, in another of such positions, to allow the movable clutch element to complete its axial shifting movement.

13. In a synchronizing transmission, driving and driven rotatable members coaxially arranged, a hub mounted on said driven element and having peripheral teeth, an annular moveable jaw clutch element surrounding and carried by said hub, said movable jaw clutch element having internal teeth meshing with the aforesaid teeth and axially movable with respect thereto, into engagement with jaw clutch teeth carried by said driving member, thus to establish a positive drive connection between said members, a synchronizer ring associated with said hub and adapted under axial pressure to establish frictional synchronizing engagement with said driving member for effecting synchronization of said members, and a thrust member arranged to receive axial thrust from said movable clutch element and associated with said synchronizer ring in such a manner as to transmit such thrust thereto and to form therewith a circumferential lost motion driving connection between said hub and ring, said synchronizer ring including peripheral teeth adapted, in one of its positions permitted by said lost motion connection, to block the path of axial movement of said movable clutch element teeth and, in another of such positions, to receive said movable clutch element teeth so as to allow said movable clutch element to complete its axially shifting movement.

14. In a synchronizing transmission, driving and driven rotatable members coaxially arranged, a hub mounted on said driven member and having peripheral teeth, an annular movable jaw clutch element having internal teeth meshing with said peripheral teeth and axially slidable relative thereto into clutching engagement with jaw clutch teeth formed on said driving member, thus to establish a positive drive connection between said members, a synchronizer ring carried by and axially movable with respect to said hub into frictional driving engagement with said driving member, and a thrust bar interposed between said movable jaw clutch element and said hub, its longitudinal axis extending parallel to the axis of said members, arranged to yieldingly receive axial thrust from said movable clutch element, and its end received in an axially opening circumferential recess in said synchronizer ring and engaged against the bottom of said recess, whereby to form with said ring a circumferential lost motion connection and to transmit thrust thereto, said synchronizer ring having peripheral teeth adapted in one of its positions permitted by said lost motion connection, to block the path of axial movement of said movable clutch element teeth and, in another of such positions, to receive such teeth so as to allow the movable clutch element to complete its axial shifting movement.

15. In a transmission synchronizer, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element axially movable with respect to said one member into frictional driving engagement with said other member, means including substantially rigid thrust members having in aggregate a low inertia relative to said movable jaw clutch element, each operatively interposed between said synchronizer element and said movable clutch element for transmitting thrust from said movable clutch element to said synchronizer element so as to establish frictional driving engagement between said members, means providing a break away connection between said thrust members and said movable jaw clutch element, said last means comprising projecting elements carried by said thrust members and engageable in complementary recesses in the movable jaw clutch element and cushions of compressible material interposed between said one torque-transmitting member and said thrust members and urging the latter toward said movable clutch element whereby to transmit, through the medium of said thrust members, yielding pressure of said projecting elements against said movable jaw clutch elements.

16. A transmission synchronizer comprising a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted under axial pressure to establish frictional synchronizing engagement with said other member, and means for transmitting axial thrust from said movable clutch element to said synchronizer element so as to establish such frictional driving engagement, said last means including a thrust member of relatively rigid material, and a cushion of compressible material interposed between said one torque-transmitting member and said thrust member and urging the latter radially outwardly toward said movable clutch element.

17. A transmission synchronizer comprising a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element axially movable with respect to said one member into frictional driving engagement with said other member, and means for transmitting axial thrust from said movable clutch element to said synchronizer element so as to establish such frictional driving engagement, said last means including a relatively rigid thrust member, disposed with its longitudinal axis parallel to the axis of said members, interposed between said one torque-transmitting member and said movable clutch element with one end abutting said synchronizer element, and a cushion of compressible material interposed between said thrust member and said one torque-transmitting member and urging said thrust member yieldingly outwardly toward said movable clutch element.

18. A transmission synchronizer comprising a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element adapted under axial pressure to establish frictional synchronizing engagement with said other member, and means for transmitting axial thrust from said movable clutch element to said synchronizer element so as to establish such frictional driving engagement, said last means including a relatively thin, flat thrust bar disposed in a plane parallel to the axis of said members and normal to a radius thereof, said bar having axially spaced end members projecting radially inwardly, one of said end members being in abutting engagement with said synchronizer element, and a cushion of compressible material received between said end members and between said thrust bar and said one torque-transmitting member and yieldingly urging said bar outwardly toward said movable clutch element.

19. A transmission synchronizer as defined in claim 18, wherein said thrust bar is provided with a radially inwardly depressed socket, and a ball element is received in said socket, thereby held against lateral displacement, and urged by said cushion, through the medium of said bar into yielding engagement with a cooperating depression in said movable clutch element.

20. In a synchronizing transmission, a pair of axially aligned torque transmitting members, a movable jaw clutch element drivingly associated with one of said members and adapted to be moved into engagement with a jaw clutch element drivingly associated with the other member, thus to establish a positive drive connection between said members, a synchronizer element drivingly associated with said one member and adapted under axial pressure to establish frictional synchronizing engagement with a friction clutch element drivingly associated with said other member, and a thrust member arranged to receive axial thrust from said movable clutch element and associated with said synchronizer element so as to transmit such thrust thereto and so as to form a circumferential lost motion driving connection between said synchronizer element and said one torque transmitting member, said synchronizer element including blocking means adapted, in one of its positions permitted by said lost motion connection, to block the path of axial movement of said movable clutch element and, in another of such positions, to allow the movable clutch element to complete its axial shifting movement.

21. In a synchronizing transmission, a pair of axially aligned and axially fixed torque transmitting members, an annular movable jaw clutch element surrounding and drivingly associated with one of said members, said jaw clutch element being axially movable into engagement with jaw clutch teeth drivingly associated with said other member, thus to establish a positive drive connection between said members, a synchronizer ring drivingly associated with said one member and adapted under axial pressure to establish frictional synchronizing engagement with a friction clutch element drivingly associated with said other member, and means for transmitting axial thrust from said movable clutch element to said synchronizer element so as to establish such frictional synchronizing engagement, said last means including an axially disposed thrust bar interposed between said movable jaw clutch element and said one torque transmitting member and having an end region in thrust transmitting association with said synchronizer element, a radially outwardly projecting element carried by said thrust bar and engageable in a complementary recess in an interior surface of said movable jaw clutch element, and a cushion block interposed between said thrust bar and said one torque transmitting element, yieldingly urging said thrust bar radially outwardly and transmitting to said projecting element through the medium of said thrust bar, yielding pressure serving to establish between said projecting element and said recess a break-away thrust transmitting connection between said movable jaw clutch element and said thrust bar.

SAMUEL O. WHITE.